CONDUCTIVITY IN SIEMENS $cm^{-2}$ OF SEPARATORS ON ZINC METAL AT VARIOUS TIMES AFTER IMMERISION IN 20% $ZnCl_2$ SOLUTION. WEIGHT OF SEPARATOR BEFORE ACTIVATION 4 mg/$cm^2$.

INVENTOR

Winfried Krey

INVENTOR
WINFRIED KREY,

United States Patent Office 3,730,777
Patented May 1, 1973

3,730,777
SEPARATOR FOR GALVANIC DRY CELLS EMPLOYING AQUEOUS ELECTROLYTE
Winfried Krey, Neunheim, Germany, assignor to Varta Gesellschaft mit beschrankter Haftung, Ellwangen (Jagst), Germany
Continuation of abandoned application Ser. No. 806,800, Mar. 13, 1969. This application Apr. 27, 1971, Ser. No. 137,985
Claims priority, application Germany, Mar. 30, 1968, P 17 71 082.6; Mar. 4, 1969, P 19 10 924.1
Int. Cl. H01m 3/02
U.S. Cl. 136—131                                          8 Claims

ABSTRACT OF THE DISCLOSURE

Separators for galvanic dry cells which employ an aqueous electrolyte are prepared from mixtures of synthetic resins. At least one of these resins is soluble in water or in the aqueous electrolyte used in the dry cell and at least one resin is insoluble in the cell electrolyte. All the resins employed however must be soluble in the same single or multi-component organic solvent yielding a homogeneous solution. The separator is introduced into the cell by application of the homogeneous solution to one electrode. In contact with the aqueous dry cell electrolyte the separator is rendered permeable to water and dissolved ions. Additional substances such as fillers, swelling agents, ion exchangers, etc., may be incorporated in the separator to improve performance.

---

This application is a continuation of application Ser. No. 806,800, which is now abandoned.

This invention relates to a dry cell containing an aqueous electrolyte and a separating layer between a depolarizing body (or cathode) and an anode.

It is well known that the performance of dry cells on high current drain discharges, particularly under continuous load conditions, can be considerably improved by increasing the amount of aqueous electrolyte in the cathode mix.

The manufacture of dry cells with cathode mixes containing large amounts of electrolyte is however attended by process difficulties. For instance, one known method of manufacturing so-called paper-lined cells is to form the mix into a cylindrical cathode and then wrap the cylinder in paper coated with thickening agents such as cereals, cellulose derivatives, etc. The wrapped cathode is then inserted into a zinc beaker which serves the dual purpose of anode and cell container. The wrapped cathode is then further compressed to take the internal form of the zinc beaker and establish contact between the electrodes, necessary for the proper operation of the cell. With wet mixes the mechanical stability of the cathode cylinder is often insufficient to permit the wrapping operation to be carried out properly and further the paper wrap absorbs electrolyte very rapidly from the mix and thereby decreases its mechanical strength so that during the final pressing operation the paper may tear leading to internal short-circuiting of the cell.

The above processing difficulties may be wholly or partly overcome by a modified manufacturing technique wherein the coated paper is first placed in the zinc beaker and then the cylinder of cathode mix is inserted.

However, in all paper-lined cells irrespective of the manufacturing process, the inclusion of paper, which is essential for the mechanical separation of anode and cathode, leads to the other undesirable features. During discharge for example insoluble reaction products may be deposited in the pores of the paper thus reducing or completely destroying the electrolytic contact between the anode and cathode and consequently impairing the electrical performance of the cell. Or, during storage of the cell, electrolyte contained in the separator migrates into the cathode. The active area of the anode is thereby reduced again leading to inadequate performance.

The disadvantages associated with the use of paper may obviously be avoided if the coating of thickeners, swelling agents, etc., is applied directly to the inner wall of the zinc beaker in such quantity that after drying the residual film has sufficient mechanical strength to serve as a separator between the anode and cathode.

Such techniques are indeed known. Where, however, aqueous suspensions of starch or other customary swelling agents are employed, prolonged drying times are required. Further, the drying process is very critical since insufficient drying leaves the film mechanically weak leading to internal short-circuiting during further cell processing and overdrying causes the film to shrink away from the metal surface and may even induce rupture of the separator.

The drying time may be shortened and the drying process rendered more uniform if water is excluded from the system. For instance, a conventional synthetic binding agent such as polyvinyl acetate, polyacrylic acid esters, synthetic rubber or polyisobutylene may be dissolved in a suitable organic solvent and starch or other cereal in the form of powder suspended in the solution. After evaporation of the solvent the residual film consists of the binding agent with grains of the swelling agent embedded in it. Since the binding agent is insoluble in the cell electrolyte only those grains of swelling agent which are in the surface of the layer, or in contact with grains in the surface, will be able to absorb electrolyte. This implies that the active area of the anode and the electrolytic contact to the other cell components is dependent on the ratio of swelling agent to binding agent in the film. The proportion of binding agent in the separator however cannot be arbitrarily reduced since the adhesion of the film to the anode and also its mechanical stability will be unfavorably affected.

An object of the present invention is therefore to provide a suspension or other composition from which separators in the form of films can be prepared; the composition will dry quickly and uniformly; in the dry state the separator will adhere to metal electrodes and be mechanically stable; in contact with the aqueous electrolyte used in the cell the separator will retain adequate mechanical stability thus avoiding internal short-circuits and the swelling of any swelling agent included in the composition will not be prevented or retarded.

A particular advantage of separators according to this invention is that they are eminently suited to use in dry cells with zinc anodes and which contain as electrolyte aqueous solutions of ammonium chloride and zinc chloride or of zinc chloride alone.

The essence of the present invention resides in the preparation of a homogeneous solution of certain resins in the same single or multi-component organic solvent. Of these resins, at least one is soluble in water or in the aqueous electrolyte used in the cell and at least one is insoluble in the cell electrolyte. The film formed from such a homogeneous solution by evaporation of the organic solvent is a separator which in contact with the aqueous electrolyte of the cell forms a microporous layer readily permeable to ions and water. The electrolyte insoluble resin functions as a binding agent and provides for the adhesion of the separator to the metal electrode and also imparts the necessary mechanical strength, even in the wetted condition. The resin which is soluble in water or in the electrolyte may swell in the film or be entirely removed by solution and thus provides for the water and ion permeability.

Resins which are soluble in water or in the aqueous electrolyte of the cells are for example polyvinylmethylether, polyethyleneglycol, and finally resins consisting of esters of phthalic acid with polyalcohols such as pentaerythritol.

Resins which are insoluble in the aqueous electrolyte of the cell include polystyrene, copolymers of vinyl chloride and vinylacetate and also copolymers of butadiene and acrylonitrile. Other insoluble resins which may be used include polyvinylacetate and halogenated polybutadiene.

It is to be clearly understood that from each class of resins mentioned above the individual reins or combinations thereof may be employed.

To the homogeneous solution of resins in the organic solvent may be added, if desired, a swelling agent which does not dissolve or swell in the organic solvent but which swells in contact with water or the aqueous electrolyte used in the cell. Such swelling agents improve the electrolytic contact between the metal electrode and the aqueous electrolyte in the cell. The invention has the advantage over standard techniques that every individual grain of additional swelling agent is accessible to the cell electrolyte and can therefore swell to the full extent.

Typical examples of such additional swelling agents are starch, flour, Karaya gum, methyl cellulose, carboxymethyl cellulose and particularly inorganic ion exchange material such as bentonite or organic ion exchange resins such as copolymers of styrene with divinylbenzene containing active ion exchange radicals such as sulfonate, phosphonate, carboxylate, amino or quaternary ammonium radicals.

Further, an inert filler may be suspended in the homogeneous solution of resins in the organic solvent. Such fillers primarily accelerate the drying process and also increase the thickness and thereby the electronic resistance of the separator. Particularly suitable for this purpose are the various modifications of silica ($SiO_2$) such as Aerosil, diatomaceous earth, fine sea sand and further insoluble metallic oxides such as zinc oxide and magnesium oxide.

When a swelling agent and/or an inert filler is added to the homogeneous solution of resins in the organic solvent it has been found advantageous to restrict the particle size to a maximum of $50\mu$. Although the particle size does not influence the thickness of the dried film to an appreciable extent (this being a function of the amount), larger particles tend to block the nozzles of spraying devices which may be used for the application of the suspension to the electrode, and further lead to undesirable sedimentation of the suspension.

In order to facilitate the drying of the solution or suspension after application to the electrode it is expedient to use those resins which are soluble in low boiling solvents such as acetone, ethyl acetate, methylene chloride, etc. In particular acetone has been found to be a very serviceable solvent especially when the solution or suspension has been applied in the form of a spray. The rate of evaporation of the acetone from such coatings is great enough to obviate the necessity for any additional drying. However, should a solvent or mixture of solvents be employed which is rather less volatile than acetone, it is expedient to accelerate the drying process by application of a warm air stream.

It is advantageous to adjust the viscosity of the solution or suspension in order to maintain favorable conditions for application to the electrode and to avoid excessive flow after application or sedimentation of the solids. The viscosity is easily regulated by varying the amount of solvent and for spray application it is recommended that it should be maintained at about 10 centipoise.

In order to derive the maximum advantage inherently available in the invention it is necessary to observe certain restrictions regarding the relative amounts of the various components.

To one part by weight of the water or electrolyte soluble resin should be added 0.15 to 1.5 parts by weight of the resin which is insoluble in the electrolyte. It is understood that both of these components must be soluble in the same organic solvent or mixture of solvents so that a homogeneous solution is obtained. The lower limit of the ratio between the two resins (0.15:1) is determined by the minimum acceptable mechanical strength of the separator when in the finished cell. The upper limit (1.5:1) is given by the maximum amount of electrolyte insoluble resin which can be incorporated in the separator without unduly restricting the swelling of the electrolyte soluble resin. Ratios varying between 0.3:1 and 0.9:1 have been found to meet most usual requirements.

Should swelling agents be added to the homogeneous solution described above, their weight should not exceed 24 times the total weight of resins in the solution. Greater amounts impair the mechanical strength and adhesive properties of the dried separator.

Similarly the weight of inert filler which may be added to the homogeneous solution of resins is limited to a maximum of 24 times the total weight of the resins in order to avoid mechanical instability of the separator. Certain fillers have very high specific surfaces e.g. diatomaceous earth) and in these cases the maximum tolerable amount may be appreciably less than the limit quoted due to absorbtion of the resins on the surface.

The same limit applies obviously when mixtures of swelling agents and inert fillers are employed.

The thickness of the dried separator after application to the electrode may be very accurately controlled. Preferably the thickness, according to the composition, is kept between $10\mu$ and $300\mu$ although thicker films may be prepared without difficulty.

The separator prepared from the homogeneous solution or the suspension already referred to is a hard compact mass in the dry state. It is impermeable and possesses neither electronic nor electrolytic conductivity and therefore must be activated before a galvanic cell in which the separator is used will operate.

By activation is meant the process whereby the hard dry separator is converted into a microporous matrix permeable to water and dissolved ions.

It is an advantage of the invention that, due to the incorporation of a water soluble or aqueous electrolyte soluble synthetic resin in the separator, the activation process proceeds spontaneously in the galvanic cell, thus simplifying the manufacturing technique.

If, however, a piece of a dried separator film containing for example a water soluble resin is suspended in water, the activation process can be followed visually. The dissolving resin produces changes in the refractive index of the water at the surface of the separator. After sufficient time has elapsed, all the soluble resin may have been removed from the film leaving a microporous matrix behind. The matrix can then be removed and dried. That such a matrix is in fact porous can be inferred from the fact that such films show the Tyndall light dispersion effect. An estimate of the pore volume and of the mean pore radius can be obtained by other standard techniques such as by means of a mercury porosimeter. The figures quoted later in the examples have been obtained in this way. Although the results obtained on any one separator are perfectly reproducible, the absolute accuracy is somewhat questionable, particularly in the case of the average pore radius, since the matrix tends to collapse under the relatively high pressures employed.

It will be perfectly clear that the degree of permeability achieved in the activated separator can be varied within wide limits by varying the ratio of the soluble to the insoluble resin in the homogeneous solution and by the nature and relative amounts of additional swelling agents.

The separator films may be prepared from the solution or suspension by any of the conventional techniques well known and widely used in industry. For instance, the mother liquor may be poured out onto a glass surface, or it may be rolled onto metal or it may be applied by air or airless spraying equipment.

In the case of dry cells, which are generally cylindrical in form, it is a particular advantage of the invention that the separator can be deposited directly onto the electrode, thus avoiding additional handling procedures. Should the separator be deposited onto the cathode, similar difficulties may be expected to arise as have already been mentioned in the case of paper-lined cells, i.e. the pores will be blocked by insoluble reaction products during discharge and there will be a constant tendency for electrolyte to migrate to the cathode during storage. The latter effect will however be less serious since the separator pores are very much finer than in paper and the capillary forces retaining electrolyte in the film correspondingly stronger.

It is therefore preferable to apply the separator directly to the inner surface of the beaker shaped metal anode, usually of zinc. In view of the quick drying properties of the solution (or suspension) some form of spraying technique is to be preferred. Air spraying systems have been found to be rather less successful since they tend to produce powdery deposits lacking adequate cohesion and adhesion. Airless spray techniques give better coatings but the high pressures involved increase the material throughput rate to such an extent that the final film thickness is often excessive.

A simple but effective special technique has therefore been developed. A pump is employed which in characteristics and general appearance resembles a medical injection needle. At each stroke of the piston the pump delivers a specific volume of fluid in a continuous stream through a fine delivery tube terminating in an orifice of about 0.6 mm. diameter. For a "D" size cell the delivery is of the order of 1 cm.$^3$ of fluid per stroke. Simultaneously the zinc beaker is rotated rapidly about the longer axis, and the delivery orifice is displaced a distance corresponding to the height of the cell. It is advantageous to begin the operation at the open end of the beaker. In this way a continuous stream of fluid is applied in the form of a fine spiral which is distributed uniformly over the inner surface of the beaker by virtue of the centrifugal force from the rotary motion. The speed of displacement of the orifice and the rate of rotation of the beaker can be independently varied to match the characteristics of the solution or suspension being applied.

In the examples which follow, this is the technique referred to as "continuous stream lamination."

The means by which the objects of this invention are obtained are described more fully with reference to the accompanying drawings in which.

Figure 1:
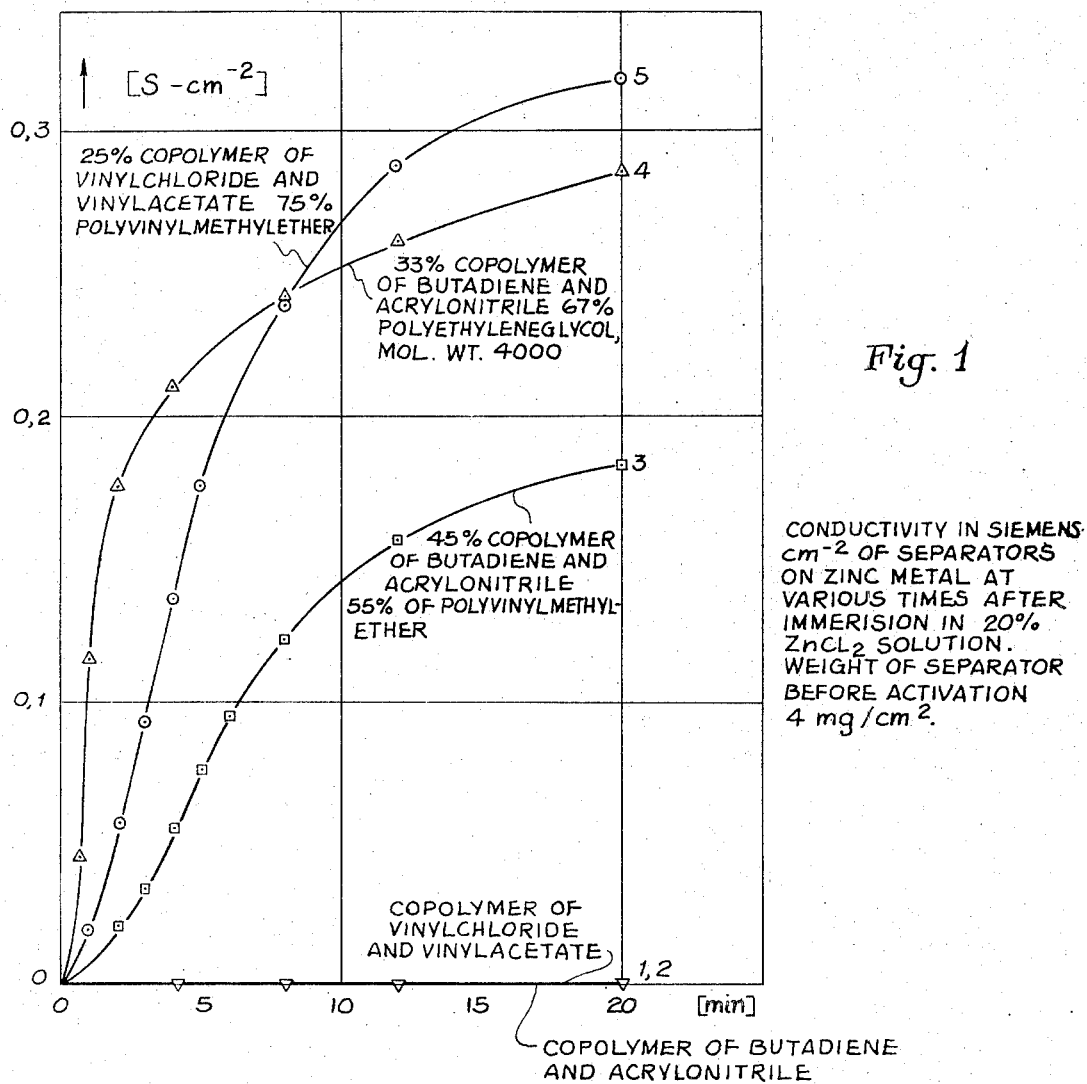
FIG. 1 is a diagram showing the electrical conductivities of various separators.

In FIG. 1 the ordinates represent the conductivity of various separators, expressed in Siemens per cm.$^2$ of surface. The abscissae represents the time elapsed after immersion in a 20% aqueous solution of zinc chloride at which the conductivity was measured. All the separators were deposited on zinc sheet. The weight per unit area was 4 mgrms. cm.$^{-2}$ for all the separators investigated. Curves 1 and 2 are for separators composed entirely of resins which are insoluble in water or in the aqueous electrolyte. The films are non-porous, even after prolonged immersion. This type of separator is therefore completely unsuitable for galvanic cells. Curves 3, 4 and 5 represent the behavior of separators made according to the invention. In these cases one of the components of the separator swells or dissolves in the aqueous electrolyte, thus rendering the film permeable to the solution. The progress of this activation is indicated by the increasing conductivity with time.

Figure 2:
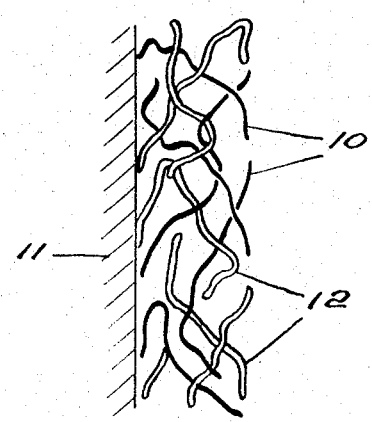
FIG. 2 is a schematic representation of a separator in the dry state.
Figure 3:
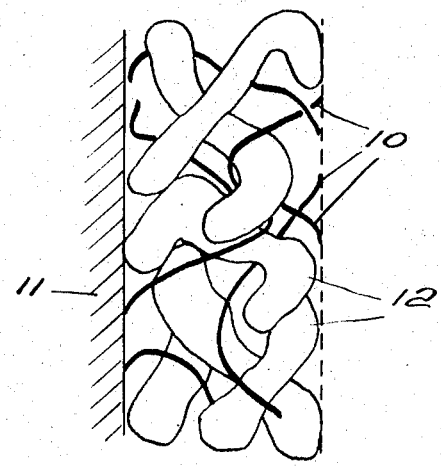
FIG. 3 is a schematic representation of the same separator as FIG. 2 shortly after immersion in an aqueous electrolyte.
Figure 4:
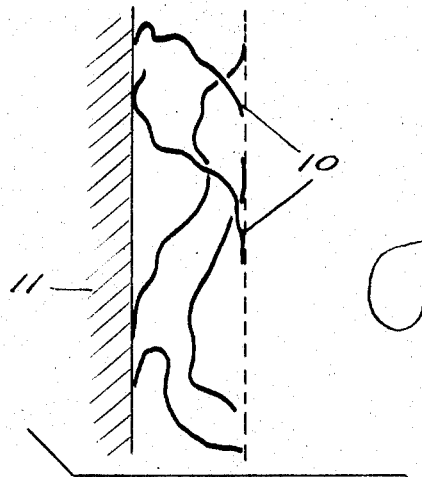
FIG. 4 is a schematic representation of the same separator as FIG. 2 after prolonged immersion in the electrolyte.
Figure 4:
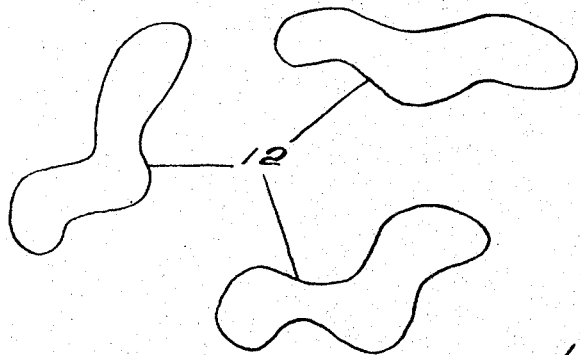

FIGS. 2, 3 and 4 are intended to illustrate diagrammatically the condition of the separator at various stages. In FIG. 2, the film is a hard, dry compact mass of macromolecules of two types, one (10) being the binding agent and completely insoluble in the aqueous electrolyte and (12) being the macromolecules of the resin which is soluble in water or the electrolyte. In FIG. 3, shortly after the separator is brought into contact with an aqueous electrolyte, the macromolecules (12) are beginning to swell due to absorption of electrolyte. The thickness of the film increases but the macromolecules (10) remain firmly anchored to the metal electrode (11) forming a matrix with the swollen resin retained in its pores. FIG. 4 illustrates the end stage where all the soluble resin has diffused out of the matrix. The latter however is still sufficiently coherent and has adequate mechanical strength to serve as a separator.

The foregoing describes an extreme case in which one resin is completely removed from the film leaving a microporous matrix behind. The other extreme is the case when the resin does not dissolve but merely swells on absorption of electrolyte thus providing the ionic permeability. According to the quantity and quality of the resin employed every intermediate stage may be achieved.

The following examples are merely illustrative of the present invention and are not intended as a limitation upon the scope thereof. In order to describe the composition of the separators concisely the following trade names of commercially available to products have been used:

Pliobond 20: Manufacturer: Goodyear Company, Akron, Ohio. This is a 20% solution of a copolymer of butadiene and acrylonitrile in methylethylketone.

Hostalit M 131: Manufacturer: Farbwerke Hoeschst A.G. Hoechst, West Germany. This is a coploymer of vinyl acetate with vinyl chlroide containing a little maleic acid.

Lutonal M 40: Manufacturer: Badische Anilin-und Soda-Fabrik. This is polyvinyl methyl ether.

EXAMPLE 1

1 part by weight of polyethylene glycol, molecular weight 4000, was dissolved in 5 parts by weight of warm acetone (35° C.). To this was added 4 parts by weight of Pliobond 20.

The homogeneous solution thus obtained was applied by continuous stream lamination to the inner wall of a magnesium cell container (beaker form) and dried in a warm air stream. The drying time was of the order of 2–3 seconds. When 30 $\mu$l./cm.$^2$ of solution was applied, the dried separator was 40$\mu$ thick.

When the separator was activated in 10% magnesium chloride solution, the polyethylene glycol was almost completely removed leaving a porous film firmly adhering to the metal. The pore volume amounted to 0.72 cm.$^3$/grm. with an average pore radius of 17.5$\mu$.

EXAMPLE 2

2 parts by weight of polyethylene glycol, molecular weight 4000 and 1 part by weight of Hostalit M 131 were dissolved in 10 parts by weight of warm acetone (35° C.).

Separator films were prepared from the homogeneous solution by pouring out onto glass plates and drying in air.

This type of separator can be activated with aqueous electrolytes such as 20% ammonium chloride or 30% zinc chloride solution.

EXAMPLE 3

1 part by weight of polystyrene and 3 parts by weight of Lutonal M 40 were dissolved in a two component organic solvent consisting of 10 parts of toluene and 5 parts by weight of methylene chloride.

Films can be prepared from this homogeneous solution by pouring out onto glass or metal and drying in a warm air stream.

These films are stable in contact with manganese dioxide, mercuric oxide, silver oxide, etc., and may be activated in alkaline electrolytes such as aqueous KOH or NaOH solutions of 30–40% concentration.

Activated with water, the above type of separator attains a pore volume of 1.61 cm.$^3$/grm. with an average pore radius of 0.13$\mu$.

EXAMPLE 4

Suspension: Monomeric styrene is copolymerized with divinylbenzene. The product is then sulphonated and the sodium salt prepared. The product is ground down to 40$\mu$ and suspended in an equal weight of acetone.

Solution I: Lutonal M 40 is dissolved in an equal weight of acetone.

5 parts by weight of the above suspension, 1 part by weight of Solution I and 2 parts by weight of Pliobond 20 are intimately mixed. This suspension, despite the small particle size of the solid phase, tends to sedimentation on protected standing and gentle agitation immediately prior to use is recommended.

The suspension was applied by continuous stream lamination to the inner wall of beaker shaped zinc containers. Two sizes of containers were treated, both having a wall thickness of 0.44 mm. One type had an outside diameter of 31.5 mm. and a height of 58 mm. and the second had a diameter of 30 mm. and a height of 51.4 mm. The zinc cans were rotated at 4200 r.p.m. For the larger size 1.2 cm.$^3$ of suspension were applied and for the smaller 1.0 cm.$^3$.

The coating was dried in an air stream of 100–150 cm.$^3$ per second and took about 5 seconds with air at 20° C. and 1–2 seconds with air at 80° C.

These separators are especially suitable for activation in concentrated aqueous solutions of zinc chloride.

An alternative method of preparing the sodium polystyrenesulfonate used in the suspension described above is to neutralize cross-linked polystyrenesulfonic acid with NaOH, dry the product at 105° C. in a hot air oven and finally grind the dry material in a ball mill and separate the fraction below 40$\mu$ by sieving. Cross-linked polystyrenesulfonic acid is readily available from the chemical industry.

EXAMPLE 5

Ten parts by weight of karaya gum, particle size 40$\mu$ were added to an equal weight of acetone. Three parts by weight of Lutonal M 40 and one part by weight of Hostalit M 131 were added and the whole vigorously agitated for several hours until a stable suspension was obtained.

This suspension can be applied as described in the previous example.

EXAMPLE 6

Six parts by weight of diatomaceous earth are suspended in an equal weight of toluene and five parts by weight of methylene chloride. In this suspension 1 part by weight of polystyrene and three parts by weight of Lutonal M 40 are dissolved.

This suspension can be applied to electrodes by the continuous stream lamination technique or by conventional dipping processes.

The dried film may be activated by treatment with water, aqueous zinc chloride solutions, KOH and NaOH solutions and also with 40% H$_2$SO$_4$.

I claim:

1. In a galvanic dry cell using an aqueous electrolyte, the combination with a separator material which in the inactive condition consists of a solid solution of at least one synthetic resin which is soluble in the aqueous electrolyte of the galvanic cell, selected individually or in combination from the group consisting of polyethyleneglycol, polyvinylmethylether, and esters of phthalic acid and polyalcohols, dissolved in at least one other synthetic resin, selected individually or in combination from the group consisting of polystyrene, copolymers of butadiene with acrylonitrile, and copolymers of vinyl chloride with vinylacetate, which is insoluble in the said electrolyte, all the resins employed being soluble in the same organic single or multi-component solvent, and a weight of finely divided swelling agent, not to exceed 2400% of the weight of the synthetic resins used, which swells in the aqueous electrolyte of the galvanic cell uniformly distributed throughout the solid solution of synthetic resins.

2. A separator material according to claim 1, in which the sweling agent is selected individually or in combination from the group consisting of starch, flour, karaya gum, methylcellulose, carboxymethylcellulose, and bentonite.

3. A separator material according to claim 1, in which the swelling agent is one or a mixture of organic ion exchange resins.

4. A separator material according to claim 3 in which the organic ion exchange resins consist of copolymers of styrene with divinylbenzene and the active ionic exchange radicals are selected from the group sulfonate, phosphonate, carboxylate, amino, and quaternary ammonium radicals.

5. A separator material according to claim 1, in which a finely divided inert filler is distributed throughout the solid solution of synthetic resins in addition to a swelling agent.

6. A separator material according to claim 5, in which the inert filler is selected individually or in combination from the group consisting of sand, diatomaceous earth and zinc oxide.

7. A separator material according to claim 5 in which the swelling agents and the inert fillers employed have particle sizes in the range of 0.01$\mu$ to 50$\mu$.

8. A separator material according to claim 5, in which the thickness of the separator lies between 10 and 300$\mu$.

References Cited

UNITED STATES PATENTS

| | | | |
|---|---|---|---|
| 3,351,495 | 11/1967 | Larsen et al. | 136—146 |
| 3,558,364 | 1/1971 | Krey | 136—146 |
| 3,513,033 | 5/1970 | Watanabe et al. | 136—146 X |
| 2,923,757 | 2/1960 | Klopp | 136—131 X |
| 3,023,261 | 2/1962 | Louis et al. | 136—146 X |
| 3,035,110 | 5/1962 | Corren | 136—146 X |
| 3,069,340 | 12/1962 | Mindick et al. | 136—146 X |
| 3,092,518 | 6/1963 | Cahoon et al. | 136—148 X |
| 3,458,362 | 7/1969 | Arms | 136—146 |

DONALD L. WALTON, Primary Examiner

U.S. Cl. X.R.

136—146